United States Patent Office 3,209,042
Patented Sept. 28, 1965

3,209,042
TREATMENT OF POLYPHENYLS
Daniel A. Scola, Andover, and Robert J. Wineman, Concord, Mass., assignors, by mesne assignments, to the United States of America as represented by the United States Atomic Energy Commission
No Drawing. Filed Oct. 29, 1962, Ser. No. 233,914
10 Claims. (Cl. 260—668)

This invention deals with systems which employ organic fluids for cooling and moderating a nuclear reactor and more particularly provides a new and valuable method of reclaiming such fluids after use so that they may subsequently serve as fresh coolants.

The technical and economic feasibility of organic-moderated and -cooled power reactors had been proven in the Organic Moderated Reactor Experiment (OMRE) wherein there has been demonstrated the relatively low decomposition rates of the organic coolants (C. A. Trilling, "OMRE Operating Experience," Nucleonics 17 No. 11, page 113 (1959). The organic coolants are generally mixtures of polyphenyls, including biphenyl, the terphenyls and higher polyphenyls up to, say, octaphenyl and triphenylenes, and alkylation products thereof wherein one or more benzene rings are substituted by a lower alkyl radical, i.e., methyl, ethyl, propyl, or isopropyl. The preferred coolants are mixtures of polyphenyls having a vapor pressure lower than that of biphenyl, and consisting at least about 90 percent by weight of polyphenyls boiling in the terphenyl range. Santowax R, Santowax OM and Santowax OMP which are registered trademarked products produced by Monsanto Chemical Company, are typical, commercially available coolants. They are characterized as follows:

| Wt. Percent of— | Santowax OMP | Santowax OM | Santowax R |
|---|---|---|---|
| Biphenyl | | 5 | 0.6 |
| m-Terphenyl | 60 | 30 | 49 |
| o-Terphenyl | 12 | 60 | 10 |
| p-Terphenyl | 28 | 5 | 26 |
| Other hydrocarbons | | | 14.5 |

It will be noted that Santowax OMP is a mixture of isomeric terphenyls, that Santowax OM contains a small amount of biphenyl in addition to the terphenyls, and that Santowax R is a less refined product. The "other hydrocarbons" are high boiling pyrolysis products and intermediates produced in the cracking process by which Santowax R is manufactured. Santowax OM was used as OMRE Core I Coolant and Santowax R as OMRE Core II Coolant. Increasing content of m-terphenyl reduces the solidification point. Other polyphenyl fluids of use as organic coolants and moderators in nuclear reactors are biphenyl, monoisopropylbiphenyls or mixtures of monoisopropylbiphenyls with no more than 20% of biphenyl as described in U.S. Patent No. 2,902,425.

The polyphenyls, like organic materials generally, possess a tendency to decompose when subjected to heat and/or ionizing radiation. The decomposition products recombine to form molecules of greater molecular weight than those present in the original mixture of polyphenyls. There often occurs, also, a polymerization of the fragments or of the original polyphenyls. Thus, a typical composition of OMRE high boiler has been found to consist of alkylterphenyls, quaterphenyls, alkylquaterphenyls, quinquephenyls, hexaphenyls, heptaphenyls, octaphenyls, triphenylenes, phenyltriphenylenes, alkyldiphenyltriphenylenes, etc.

As the coolant is used, its composition changes owing to the pyrolysis and the radiolysis, and the average molecular weight of the coolant increases with time owing to the ever-increasing content of the high-molecular weight products. The high molecular weight products thus formed will be hereinafter referred to as high boiler because the boiling point thereof is higher than that of the original coolant. This change in composition may actually be beneficial up to a certain point, since a higher molecular weight average means a lower melting point and a lower decomposition rate. However, it has been found that increase of the high boiler cannot be permitted to continue indefinitely, because of undesired effect on the heat transfer properties. In a nuclear reactor using the terphenyl coolants, the high boiler which is steadily built up in the fluid can be tolerated up to a weight content of, say, about 30 to 40% by weight of the fluid without a substantial decrease in heat transfer. It is preferred, at least for nuclear reactor moderator and/or coolant use that percentage of high boilers in the fluid not exceed about 50%, and more preferably not above about 40%.

In view of the above, it is obvious that a disadvantage of the organic reactor is that heat and radiation cause deterioration of the polyphenyl coolant with production of high boiler in undesired quantities and that for continued operation, the detrimental high boiler content of the spent coolant must be separated therefrom and replaced by a mixture of fresh polyphenyls. This may be done, e.g., by periodically removing batches of the coolant fluid from the main coolant stream, purifying it of high boiler by, e.g., low pressure distillation to remove material boiling up to and including p-terphenyl, returning the purified fluid with additional fresh make-up to the reactor system and conducting the high boiler residue to waste storage.

Accumulation of the waste represents a weak point in the economics of organic nuclear reactors. Employing the Santowax coolants described above, power plants in the 300 mwe. range would produce as much as 25,000 pounds of high boiler per day. Hence a means of reclaiming the high boiler is not only desirable but a necessity in the attainment of an economically expedient method of, say, producing electrical power for cilivian use by means of organic cooled- and -moderated and organic cooled, water-moderated reactors.

As disclosed in our copending application, Serial No. 231,271, filed October 17, 1962, organic nuclear reactor OMR high boiler can be converted by solvent treatment into material which may be added to fresh coolant for re-use. Thus, according to the process of the copending application, OMRE high boiler is separated into an insoluble, high molecular weight fraction and a soluble, low-molecular weight fraction by contacting it with (A) an inert organic solvent for the high boiler which is capable of dissolving at least about 0.7 gram of high boiler per gram of solvent at a temperature of 25° C. to 200° C. and (B) an inert organic liquid capable of dissolving only less than about 0.3 gram of high boiler per gram of said liquid at the same temperature, the proportion of (A) to (B) being from 90:10 to 10:90 parts by volume, and the proportion of the total volume (A)+(B) to the volume of high boiler being from 2 to 1 to 20 to 1.

Depending upon the nature of high boiler and solvent, reclaimed high boiler of varying average molecular weight and viscosity can be obtained. However, the closer are the molecular weights and viscosities of the reclaimed material to the same properties of the fresh coolant, the lower is the percent conversion of high boiler into useful product. Thus while material having an average molecular weight of about 200–300 and a Brookfield viscosity at 265° C. of from 0.8 to 2.0, can be obtained from high boiler or from spent coolant by solvent distribution, such material is obtainable only at the sacrifice of good conversion yields, i.e., it may be obtainable in only a 15–20% yield, based on the high boiler. On the other hand, to obtain a conversion of, say, from 75–90%, it is necessary to be satisfied with less desirable product, e.g., one having an average molecular weight of from about 400 to about 500 and a Brookfield viscosity of about 3 or 4 to 10 cp. The question of good conversion versus relatively poor properties thus presents itself. The reclaimed material having an average molecular weight of about 200 to 300 is available in poor yields, whereas good yields are obtained only for material having a molecular weight of about 400 to 500.

The object of this invention is to provide a method of improving high boiler, e.g., the relatively high molecular weight reclaimed high boiler having a molecular weight of from about 400 to 500, and imparting thereto molecular weight and viscosity characteristics which substantially approach those of fresh coolant.

It is known in the art that one means of converting high molecular weight hydrocarbons into lower molecular weight compounds is by pyrolysis, i.e., by exposing the high molecular weight compounds to conditions of heat and catalysts in the absence or presence of pressure change. In order to control the course of pyrolytic decomposition reactions, the pyrolysis is effected in the presence of hydrogen, whereby cleaved decomposition products of olefinic character become saturated and tendency to gum-formation is thereby reduced. The hydrocracking process thus brought about is indeed efficacious in avoiding gumming; but too often it results in complete reduction to carbon, so that much of the starting material is converted into coke. This has been found to be true when high boiler is subjected to hydrocracking. Thus, it has been found that OMRE high boiler at high temperatures and elevated pressures, which conditions are generally employed hydrocracking conditions, gives coke yields which are substantial proportions by weight of the starting material, e.g., the coke yield may be as high as about 40%. Using less stringent operating conditions, conversion to coke is decreased, but yields of useful coolant material are likewise decreased.

Now we have found, however, that when reclaimed high boiler, rather than unreclaimed high boiler, is subjected to hydrocracking at temperatures of from, say, 300° C. to 600° C. and pressures of from say, 500 to 2000 p.s.i.g. in the presence of certain catalysts, there is obtained good conversion to material having the characteristics of fresh coolant with little, if any, conversion to coke. The presently useful catalyst is selected from the class consisting of (A) a metal or metal oxide of Groups I, VI and VIII of the Periodic Arrangement of Elements deposited on alumina and (B) copper chromite. Hydrocracking of the reclaimed high boiler in presence of said catalysts has been found to give good yields (62–88%) of material having the characteristics of fresh coolant and low coke yields (0.5–5%) compared to hydrocracking of OMRE high boiler. At about 480–520° C. and about 1500 p.s.i.g., coke yields of less than 2.0% have been encountered. Yields for the two-step process (solvent distribution-hydrocracking) are from 60% to 70% based on consumed high boiler. Not only does the product have molecular weight and viscosity properties close to those of fresh coolant, but also its carbon to hydrogen ratio is close to that of terphenyl, and it has better thermal stability and lower fouling ability than starting high boiler.

By reclaimed high boiler is meant that material, having an average wegiht of about 400 to 500, which is obtained by removing from high boiler, material having an average molecular weight of over 500. Generally, material having a molecular weight of about 400 to 500, i.e., the reclaimed high boiler, comprises up to 80% by weight of high boiler. Removal of material having a molecular weight of over 500 may be effected by the solvent distribution method of said copending application, or it may be effected by vacuum distillation to distill off, say, up to 80% by weight of the high boiler. The distillate thus obtained can also be reclaimed high boiler, since the less volatile components, i.e., material having a molecular weight of above 500, are not present in such a distillate in any appreciable quantity.

Fresh polyphenyl coolant generally has an average molecular weight of from 210 to 270 and a Brookfield viscosity of about 0.70 to 1.0 cp. at 265° C. High boiler, i.e., material boiling above the boiling point of p-terphenyl and accumulated in the coolant owing to pyrolysis and radiolysis, will have an average molecular weight of over 500 and a Brookfield viscosity of over 10 cp. Reclaimed high boiler obtained for example, by treatment of high boiler with a 30:70 mixture of p-xylene and kerosene for precipitation of insolubles, and subsequent filtration and removal of solvent, to obtain the reclaimed high boiler as the product, has an average molecular weight of from about 400 to about 500 and a Brookfield viscosity of above 3 to 4 cp. The presently used reclaimed high boiler can thus be characterized properly as a mixture of polyphenyls having an average molecular weight of between 400 to 500 and a Brookfield viscosity of 265° C. of about 3 to 10 cp.

Hydrocracking of the reclaimed high boiler is effected, according to this invention, by treating it with hydrogen at a temperature of at least about 300° C. and a pressure of at least 15 atmospheres. A solvent for the reclaimed high boiler may or may not be used, i.e., the reclaimed high boiler, per se, if desired in molten form, may be introduced into the reactor; but for smooth reaction and optimum control it is advised to use an inert solvent or diluent.

Advantageously, the reclaimed high boiler is dissolved in a liquid aromatic hydrocarbon of from 6 to 18 carbon atoms which is free of aliphatic unsaturation, e.g., benzene, xylene, ethylbenzene, biphenyl, or the terphenyls, and preferably benzene or an alkylbenzene having from 7 to 12 carbon atoms, and the resulting solution is passed into a reactor containing the above described catalyst. Hydrogen under pressure is either already present in the reactor or is introduced into the reactor simultaneously with the feed of reclaimed high boiler. In a continuous process, the hydrogen should be used in amounts of from 0.23 to 1.5 liters per gram of said feed, and the weight hourly space velocity of the feed will vary from 1.2 to 3.4 Excess hydrogen can be recovered and recycled. Operation in the presence of excess hydrogen is often advantageous in that thereby coking during reaction is retarded. The temperature of the process should be in the range of 300° to 600° C. Below 300° C. the hydrocracking efficiency drops rapidly to zero, and above 600° C., excessive coking of the reactant results with consequent waste of starting material and fouling of the catalyst. Optimum temperature conditions are between 480° to 540° C. The pressure should be maintained at from 200 to 1800 p.s.i.g., with the lower pressures within this range being used with the higher temperature of the 290–550° C. temperature range. The preferred pressure range is from 1000 to 1600 p.s.i.g.

When a solvent is used, the concentration of the reclaimed high boiler therein is not at all critical; generally a volume ratio of from say 3 to 1 to 1 to 15 of high boiler material to solvent is useful. It is evident of course, that the reclaimed high boiler cannot be used as a vapor in the present hydrocracking process since the boiling point of OMRE high boiler is well above the 600° C. top temperature limit of the present process. Of course, such low boiling solvent as benzene or p-xylene will vaporize in the reactor zone.

As disclosed above, catalysts for use in the present purpose include either copper chromite or a metal or metal oxide of Group I, VI and VIII of the Periodic Arrangement of Elements deposited on an alumina support. Examples of such metals are copper, silver, gold, chromium, molybdenum, potassium, iron, ruthenium, osmium, iridium, nickel, palladium, platinum, etc. The catalyst may be prepared for example, by treating alumina with a solution of an appropriate metal salt and then reducing the impregnated alumina to give an alumina having a deposit of the metal. Subsequent heating in air generally gives a deposit of the metal oxide. Presently useful catalysts are generally comercially available. Thus copper chromite is available as Girdler G–13 or G–22; chromia-alumina is a Houdry process catalyst; copper-alumina is available as Girdler T–315; alumina containing 0.5% by weight of palladium is a catalyst provided by Baker and Co., Inc.; nickel-copper-alumina is available as Girdler T–312; nickel-chromium-alumina is available as Girdler T–314, and iron-potassium-chromium-alumina is available as Girdler G–48A. Generally the alumina will have from, say 0.1% to 20% by weight of metal or metal oxide deposited thereon.

The invention is further illustrated by, but not limited to, the folowing examples:

*Example 1*

Santowax was employed as organic coolant in a nuclear reactor. The reactor was operated until the coolant had about a 38% concentration of material boiling above the boiling point of para-terphenyl. A portion of the spent coolant was removed and distilled. That part which boiled above the boiling point of the terphenyls was designated as high boiler and was separated into high molecular weight insoluble matter and low molecular weight soluble material by stirring it vigorously for a few minutes with a mixture of xylene and kerosene, substantially as described in the copending application of Serial No. 231,271, filed October 17, 1962. Thus, stirring the high boiler with about 6 times its volume of a 30:70 p-xylene-kerosene (volume) mixture for a few minutes at 100° C. caused precipitation of insoluble material which was filtered off. This precipitate comprised the highest molecular weight material of high boiler, and amounted to about 20% by weight of the high boiler. The filtrate, a solution of lower molecular weight high boiler in xylene and kerosene was distilled to remove solvent, and the residue (reclaimed high boiler) was dissolved in xylene to provide a 50% by weight solution in p-xylene of a mixture of polyphenyls, having an average molecular weight of over 400 and a Brookfield viscosity of less than 10 cp. at 265° C. It will be hereinafter referred to as a xylene solution of reclaimed high boiler. The solution was employed as follows in the presently provided hydrocracking process:

A tube reactor was packed with a catalyst consisting of finely divided alumina having freshly deposited thereon about 1% by weight of platinum. The reactor was purged first with nitrogen and then with hydrogen and the temperature and pressure of the system was brought to 525° C. under 1500 p.s.i. of hydrogen. The above described xylene solution of reclaimed high boiler was then pumped into the reactor during a 60 minute period at a rate calculated to give a liquid hourly space velocity of about 3.4, with simultaneous introduction of hydrogen at a rate which corresponded to 0.9 liter/g. of said xylene solution feed. By liquid hourly space velocity is meant volume of the solution per volume of catalyst contacted per hour. Volume of catalyst refers to total volume of the catalyst minus the volume of air space.

Product recovery was effected as follows: Gaseous products were collected using a liquid air trap. Liquid materials were collected in the high pressure receiver which formed a part of the equipment. After weighing the collected liquid it was distilled to remove material boiling below 145° C. The last traces of volatiles (solvent) were removed in vacuo until biphenyl started to distill off, at which point the product was considered to be free of solvents. The weight of liquid distillate and of the hydrocracked product were obtained. The hydrocracked product which is now useful as coolant, is obtained in a 76% yield. It was analyzed for biphenyl, the terphenyls, and all materials boiling up to and including triphenylene. It was also evaluated by viscosity, carbon-hydrogen ratio, thermal stability alone and in solution of fresh coolant, and melting range. The data obtained for the product is shown in the table below together with corresponding values for the fresh coolant, for high boiler, and for the reclaimed high boiler which was used as feed stock.

|  | Hydro-cracked product | Fresh coolant | High boiler | Feed stock |
|---|---|---|---|---|
| Molecular Weight | 246 | 230 | 550 | 406 |
| Viscosity at 265° C., cp | 0.80 | 0.82 | 11.2 | 6.6 |
| C/H ratio | 1.305 | 1.28 | 1.48 | 1.40 |
| Melting range | (1) | 70–140 | 80–110 | 58–95 |
| Decomp. Temp., alone, ° C | 410 | 490 | 360 | 370 |
| Decomp. Temp., in coolant, ° C | 447 |  | 422 | 438 |

¹ Partially liquid to 110° C.

In a similar run, conducted exactly as above except that there was used 1.3 liters of hydrogen per gram of xylene-reclaimed high boiler feed and that the duration of the run was only 15 minutes, substantially the same values were obtained as those obtained above.

For purposes of comparison, the results obtained by hydrocracking high boiler instead of the reclaimed high boiler are herein reported. Using a 50% by weight solution of high boiler in p-xylene and the 1% Pt-Al₂O₃ catalyst and the same space velocity, there was obtained at 555° C./1510 p.s.i.g. a 68% yield of useful product and a 14% yield of coke. On the other hand, similar operation with the reclaimed high boiler, as described above, gave a 76% yield of coolant useful product and only 1.0% yield of coke. Moreover, the properties of the latter product are superior, with respect to lower molecular weight and lower viscosity.

*Example 2*

Operating substantially as in Example 1, various catalysts were used with the xylene solution of reclaimed high boiler. All runs were made at 495° C.±10° C. and 1500 p.s.i.g. The runs varied in time from 1 to 3 hours. The catalysts shown below, during a 2 to 3 hours' running time, gave product which was the same during the run, i.e., the catalyst maintained its activity throughout the run and product from the latter part of the run did not differ in color and consistency from product from the early part of the run. In general, product yields were high (62–88%) and coke yields were low, (0.5 to 5%), as compared with those obtained from high boiler. The color of the feed solution of reclaimed high boiler in p-xylene was brown-black. The color of solution of product resulting from the hydrocracking reaction was generally yellow. Although color in itself cannot be a criterion for evaluating a product, the change in color from brown-black indicates that hydrocracking or hydrogenation followed by hydrocracking has ocurred.

The catalysts tested, percent product yield, and the Brookfield viscosity of the product are shown below:

| Catalyst | Hydrocracked Product Yield, Wt. percent | Brookfield Viscosity, cp/265° C. | Avg. Mol. Wt. | Coke Yield, Wt. percent |
|---|---|---|---|---|
| Nickel-copper-alumina | 65 |  | 308 | 1.8 |
| Alumina, 1 wt. percent platinum | 76 |  | 315 |  |
| Nickel-chromium-alumina | 62 |  | 330 | 2.2 |
| Molybdena-alumina | 67 |  | 276 |  |
| Iron-potassium-chromium-alumina | 88 | 1.7 | 334 | 3.2 |
| Chromia-alumina, 0.5 wt. percent Pt | 72 | 1.7 | 337 | 2.5 |
| Copper chromite | 70 | 1.2 | 288 | 4.5 |
| Copper-alumina | 80 |  | 307 |  |
| Alumina, 0.5 wt. percent Pd | 66 | 0.9 | 270 | 4.8 |
| Chromia-alumina | 69 | 0.8 | 243 | 3.8 |
| Untreated partially reclaimed high boiler |  | 6.6 | 455 |  |

In the above data, the product yield is the ratio of the weight of the distillation residue to the weight of the reclaimed high boiler which was charged, and the coke yield is the ratio of the weight of coke to the weight of reclaimed high boiler charged. The average molecular weight is that of the distillation residue which, of course, is the material which can be used as fresh coolant or moderator.

We claim:

1. The method which comprises contacting a mixture of polyphenyls having an average molecular weight of about 400 to about 500 and a Brookfield viscosity at 265° C. of about 3 to about 10 cp., with hydrogen in the presence of a catalyst selected from the class consisting of (A) a metal or metal oxide of Groups I, VI and VIII of the Periodic Arrangement of Elements deposited on alumina and (B) copper chromite, at a temperature of about 300° C. to about 600° C. and a pressure of 200 to 1800 p.s.i.g., to obtain a product having a lower average molecular weight and a lower viscosity than that of said mixture of polyphenyls.

2. The method which comprises contacting a mixture of polyphenyls having an average molecular weight of about 400 to about 500 and a Brookfield viscosity at 265° C. of about 3 to 10 cp., while dissolved in an organic solvent, with hydrogen in the presence of a catalyst selected from the class consisting of (A) a metal or metal oxide of Groups I, VI and VIII of the Periodic Arrangement of Elements deposited on alumina and (B) coper chromite, at a temperature of about 480° C. to about 540° C. and a presure of 1,000 to 1,600 p.s.i.g. to obtain a product having a lower average molecular weight and a lower viscosity than that of said mixture of polyphenyls.

3. The method which comprises contacting a mixture of polyphenyls having an average molecular weight of about 400 to about 500 and a Brookfield viscosity at 265° C. of about 3 to 10 cp., while dissolved in a liquid aromatic hydrocarbon which has from 6 to 18 carbon atoms and is free of aliphatic unsaturation, with hydrogen in the presence of a catalyst selected from the class consisting of (A) a metal or metal oxide of Groups I, VI and VIII of the Periodic Arrangement of Elements deposited on alumina and (B) copper chromite, at a temperature of about 480° C. to about 540° C. and a pressure of about 1,000 to 1,600 p.s.i.g. to obtain a product having a lower average molecular weight and a lower viscosity than that of said mixture of polyphenyls.

4. The method which comprises contacting a mixture of polyphenyls having an average molecular weight of about 400 to about 500 and a Brookfield viscosity at 265° C. of about 3 to 10 cp., while dissolved in a liquid aromatic hydrocarbon which has from 6 to 18 carbon atoms and is free of aliphatic unsaturation, with hydrogen in the presence of copper chromite as catalyst at a temperature of about 480° C. to about 540° C. and a pressure of about 1,000 to about 1,600 p.s.i.g. to obtain a product having a lower average molecular weight and a lower viscosity than that of said mixture of polyphenyls.

5. The method which comprises contacting a mixture of polyphenyls having an average molecular weight of about 400 to 500 and a Brookfield viscosity at 265° C. of about 3 to 10 cp., while dissolved in a liquid aromatic hydrocarbon which has from 6 to 18 carbon atoms and is free of aliphatic unsaturation, with hydrogen in the presence of a catalyst selected from the class consisting of alumina having deposited thereon a metal of Groups I, VI and VIII of the Periodic Arrangement of Elements and alumina having an oxide of said metal deposited thereon, at a temperature of from about 480° C. to about 540° C. and a pressure of about 1,000 to 1,600 p.s.i.g. to obtain a product having a lower average molecular weight and a lower viscosity than that of said mixture of polyphenyls.

6. The method defined in claim 5 further limited in that the aromatic hydrocarbon is xylene.

7. The method defined in claim 5, further limited in that catalyst is chromia-alumina.

8. The method defined in claim 5, further limited in that the catalyst is palladium on alumina.

9. The method defined in claim 5, further limited in that the catalyst is molybdena-alumina.

10. The method defined in claim 5, further limited in that the catalyst is platinum deposited on alumina.

References Cited by the Examiner

UNITED STATES PATENTS

| | | | |
|---|---|---|---|
| 3,062,728 | 11/62 | Duffy | 176—39 |
| 3,064,061 | 11/62 | Scola et al. | 260—668 |
| 3,086,932 | 4/63 | Bolt et al. | 260—668 |

OTHER REFERENCES

Berkman, "Catalysis," pages 819 and 927, published by Reinhold Publ. Co., N.Y. (1940).

DELBERT E. GANTZ, *Primary Examiner.*

ALPHONSO D. SULLIVAN, *Examiner..*